United States Patent
Noguchi

(10) Patent No.: US 11,403,115 B2
(45) Date of Patent: Aug. 2, 2022

(54) PROGRAM EXECUTION SUPPORT DEVICE, PROGRAM EXECUTION SUPPORT METHOD, AND COMPUTER READABLE MEDIUM

(71) Applicant: MITSUBISHI ELECTRIC CORPORATION, Tokyo (JP)

(72) Inventor: Satoshi Noguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 35 days.

(21) Appl. No.: 17/077,747

(22) Filed: Oct. 22, 2020

(65) Prior Publication Data

US 2021/0041860 A1   Feb. 11, 2021

Related U.S. Application Data

(63) Continuation of application No. PCT/JP2018/023182, filed on Jun. 19, 2018.

(51) Int. Cl.
*G06F 9/44* (2018.01)
*G06F 9/445* (2018.01)
(Continued)

(52) U.S. Cl.
CPC ..... *G06F 9/44505* (2013.01); *G05B 19/4183* (2013.01); *G05B 19/41885* (2013.01); *G06F 16/9035* (2019.01); *G05B 19/41865* (2013.01)

(58) Field of Classification Search
CPC ................ G06F 1/32; G06F 1/12; G06F 9/44
See application file for complete search history.

(56) References Cited

U.S. PATENT DOCUMENTS

2010/0057947 A1*   3/2010   Nakagawa ......... G05B 19/4185
                                                  710/19
2011/0035787 A1*   2/2011   Naslund .................. H04L 63/08
                                                  726/3
(Continued)

FOREIGN PATENT DOCUMENTS

JP          2008-117260 A          5/2008
JP          2009-181384 A          8/2009
(Continued)

OTHER PUBLICATIONS

International Search Report for PCT/JP2018/023182 dated Sep. 11, 2018.
(Continued)

*Primary Examiner* — Keshab R Pandey
(74) *Attorney, Agent, or Firm* — Birch, Stewart, Kolasch & Birch, LLP

(57) ABSTRACT

A profile reading unit (110) reads a profile including input/output information of an application program (301), as an application profile. A setting presentation unit (120) presents a setting means for allocating, to the input/output information, device data representing data to be read and written in the manufacturing facility (200) by the application program (301). The setting presentation unit (120) also acquires setting information in which the device data is allocated to input/output information. A setting unit (130) sets connection with the application program (301) based on the application profile and the setting information. A connection unit (130) supports execution of the application program (301) using facility data (22) according to the connection setting being performed by the setting unit (130).

10 Claims, 8 Drawing Sheets

(51) Int. Cl.
    *G06F 16/9035*     (2019.01)
    *G05B 19/418*      (2006.01)

(56)             References Cited

U.S. PATENT DOCUMENTS

2014/0148926 A1*   5/2014   Kawamori ............ G06F 13/409
                                                        700/19
2017/0242594 A1*   8/2017   Liu ....................... G06F 3/0659
2020/0089522 A1*   3/2020   Qiu ....................... H04L 41/083

FOREIGN PATENT DOCUMENTS

JP          2010-61352  A      3/2010
JP          2010-238085 A     10/2010
JP          2010-282466 A     12/2010
JP            4888408   B2     2/2012
JP            5034447   B2     9/2012
JP            5369832   B2    12/2013

OTHER PUBLICATIONS

Japanese Office Action for Japan Application No. 2018-562147 dated Mar. 12, 2019.

* cited by examiner

Fig. 2

| DATA NAME | MODE | DATA DESIGNATION INFORMATION |
|---|---|---|
| ROBOT A VIBRATION VALUE | DATABASE 1 | TABLE: A, FIELD: B, C |
| SERVO MOTOR α ROTATION ANGLE | SLMP | COMMUNICATION PARTNER: X, MEMORY ADDRESS Y |
| CRIMP CONTACT PORTION TEMPERATURE | SLMP | COMMUNICATION PARTNER: X, MEMORY ADDRESS Z |

161 : DATA LIST

61 : DEVICE DATA

Fig. 9

162 : DATA ATTRIBUTE INFORMATION

| No. | NAME | COMMUNICATION TYPE | DATA TYPE | TIME STAMP | COMMUNICATION PERIOD |
|---|---|---|---|---|---|
| 1 | FACILITY A TEMPERATURE INFORMATION | INPUT FROM MANUFACTURING FACILITY | REAL TYPE | FACILITY A TIME STAMP | 100ms |
| 2 | FACILITY A TIME STAMP | INPUT FROM MANUFACTURING FACILITY | HOUR TYPE | – | 100ms |
| 3 | FACILITY B TEMPERATURE INFORMATION | INPUT FROM MANUFACTURING FACILITY | REAL TYPE | – | 500ms |
| 4 | FACILITY C TEMPERATURE INFORMATION | INPUT FROM MANUFACTURING FACILITY | REAL TYPE | FACILITY C TIME STAMP | 1s |
| 5 | FACILITY C TIME STAMP | INPUT FROM MANUFACTURING FACILITY | HOUR TYPE | – | 1s |
| 6 | FAILURE WARNING DISPLAY 1 | OUTPUT TO MANUFACTURING FACILITY | LOGICAL TYPE | – | 100ms |
| 7 | FAILURE ERROR CODE DISPLAY 1 | OUTPUT TO MANUFACTURING FACILITY | INTEGER TYPE | – | 100ms |
| 8 | QUALITY WARNING DISPLAY 1 | OUTPUT TO MANUFACTURING FACILITY | LOGICAL TYPE | – | 50ms | though
PROGRAM EXECUTION SUPPORT DEVICE, PROGRAM EXECUTION SUPPORT METHOD, AND COMPUTER READABLE MEDIUM

CROSS REFERENCE TO RELATED APPLICATIONS

This application is a Continuation of PCT International Application No. PCT/JP2018/023182, filed on Jun. 19, 2018, which is hereby expressly incorporated by reference into the present application.

TECHNICAL FIELD

The present invention relates to a program execution support device, a program execution support method, and a program execution support program. Particularly, the present invention relates to execution support of a program that performs processes such as monitoring, control, and management of a manufacturing facility.

BACKGROUND ART

In factories in recent years, many software applications or Information technology (IT) systems for monitoring, controlling, and managing a production facility such as an industrial machine, a manufacturing facility, and a production site have been introduced. Technology development has been made to efficiently and effectively introduce software applications or IT systems. Software applications are also called application programs.

Patent Literature 1 describes a technique of reducing a burden of creating an application program that matches with various inspection/measurement devices having different output data formats when using a system that acquires inspection/measurement data and performs quality control.

CITATION LIST

Patent Literature

Patent Literature 1: JP 5034447

SUMMARY OF INVENTION

Technical Problem

In an application program that operates by handling data of a manufacturing facility, various interfaces are implemented according to the purposes. Then, the application program operates by inputting/outputting data held by the manufacturing facility. In specific examples, data is exchanged with using the following modes.

Data is exchanged by a comma-separated values (CSV)-format data file.

Data is exchanged with using a standardized server-client mode.

Data is exchanged with using a communication protocol created based on Transmission Control Protocol (TCP)/Internet Protocol (IP). As a practical example of this communication protocol, Message Queueing Telemetry Transport (MQTT) protocol is available.

Further, a combination of a frequency of communication with the application program and data varies as follows depending on the type of the application program.

Sensed data is continuously sent in a real time manner from a manufacturing facility in operation to an application program that performs failure prediction.

Information at the time of manufacturing the same product is sensed at different points on a manufacturing line, and pieces of obtained data are collectively sent to an application program that performs traceability management at the time of product manufacturing.

Pieces of waveform data indicating sensing data such as a current and a load value of one operation are collectively sent to an application program that monitors an operation of a device such as a press machine which repeats a specific operation.

When using an application program that operates through communication with a manufacturing site, it is necessary to perform input setting to the application program and to output setting from the application program in advance. This input/output setting varies depending on a combination mode of the interface difference and data, as described above. Often, a person who usually performs design and maintenance management of the manufacturing facility performs this input/output setting, and so it takes time to perform the setting because of the difference in the specialized fields from his or her own. In Patent Literature 1 as well, the burden of the input/output setting according to the application program cannot be reduced.

It is an objective of the present invention is to reduce a burden of input/output setting at the time of executing an application program.

Solution to Problem

A program execution support device according to the present invention supports execution of an application program using facility data communicated with a manufacturing facility, the program execution support device including:

a profile reading unit to read a profile including input/output information of the application program, as an application profile;

a setting presentation unit to present a setting means for allocating, to the input/output information, device data representing data to be read and written in the manufacturing facility by the application program, and to acquire setting information in which the device data is allocated to the input/output information;

a setting unit to set connection with the application program based on the application profile and the setting information; and a connection unit to support execution of the application program using the facility data according to connection setting being performed by the setting unit.

Advantageous Effects of Invention

In a program execution support device according to the present invention, a setting presentation unit presents a setting means for allocating, to an input/output information, device data representing data to be read and written in a manufacturing facility by an application program, and acquires setting information in which the device data is allocated to the input/output information. A setting unit sets connection with the application program based on an application profile and the setting information. Then, the connection unit supports execution of the application program using facility data according to connection setting being performed by the setting unit. Therefore, with the program execution support device according to the present invention,

BRIEF DESCRIPTION OF DRAWINGS

FIG. 2 is a diagram illustrating an example of a data list according to Embodiment 1.

FIG. 9 is a diagram illustrating an example of data attribute information according to Embodiment 2.

DESCRIPTION OF EMBODIMENTS

Figure 1:
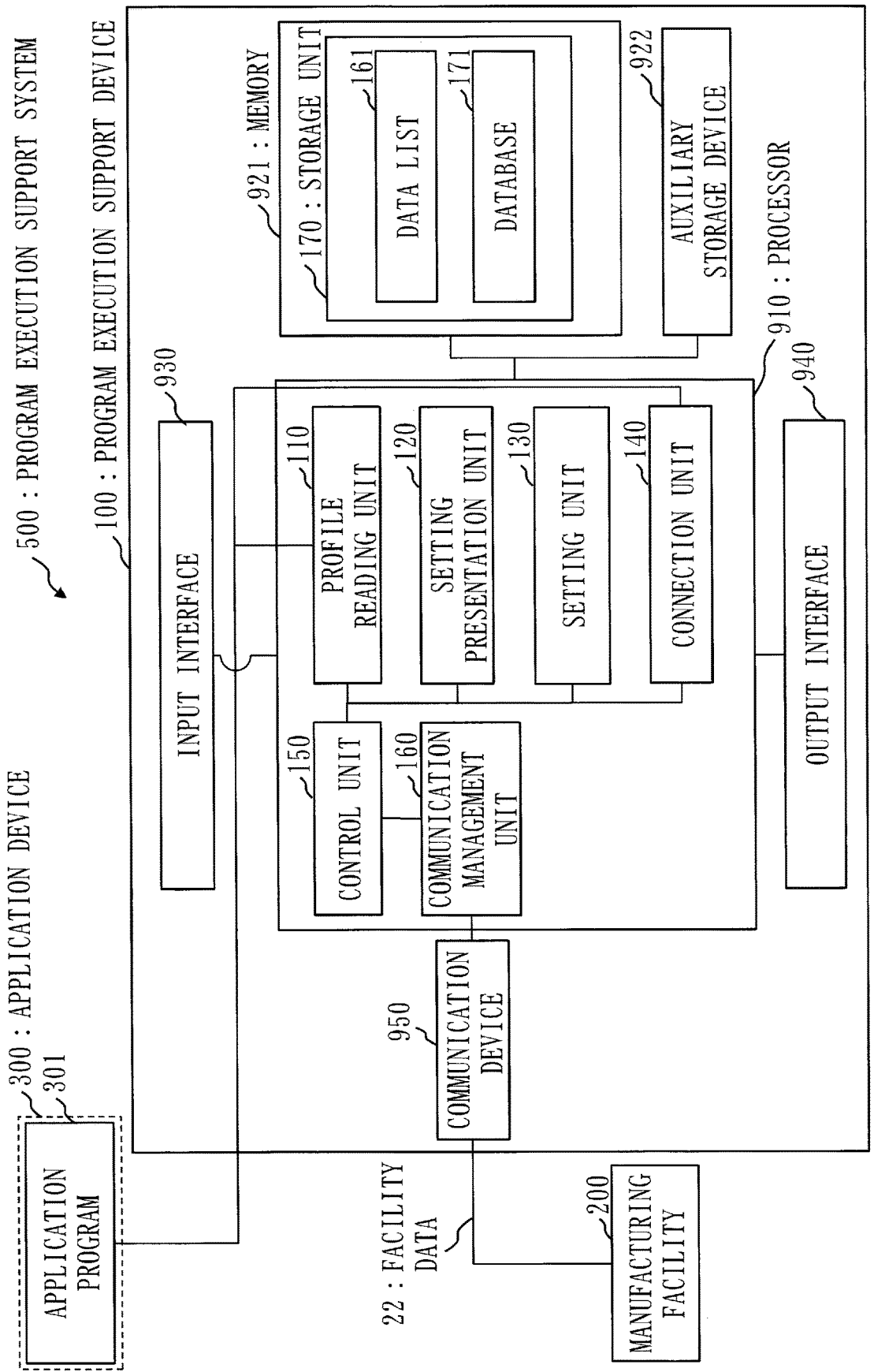
FIG. 1 is a configuration diagram of a program execution support system according to Embodiment 1.

Embodiments of the present invention will be described with referring to drawings. In the drawings, the same or equivalent portion is denoted by the same reference sign. In description of the embodiments, explanation of the same or equivalent portion will be appropriately omitted or simplified.

Embodiment 1

*Description of Configuration*

A configuration of a program execution support system 500 according to the present embodiment will be described with referring to FIG. 1.

The program execution support system 500 has a program execution support device 100, a manufacturing facility 200, and an application device 300 which executes an application program.

The program execution support device 100 supports execution of an application program 301 using facility data 22 communicated with the manufacturing facility 200. The program execution support device 100 is a computer. The program execution support device 100 is provided with a processor 910, and is also provided with other hardware devices such as a memory 921, an auxiliary storage device 922, an input interface 930, an output interface 940, and a communication device 950. The processor 910 is connected to the other hardware devices via signal lines, and controls these other hardware devices.

The program execution support device 100 is provided with a profile reading unit 110, a setting presentation unit 120, a setting unit 130, a connection unit 140, a control unit 150, a communication management unit 160, and a storage unit 170, as function elements.

Functions of the profile reading unit 110, setting presentation unit 120, setting unit 130, connection unit 140, control unit 150, and communication management unit 160 are implemented by software. The storage unit 170 is provided to the memory 921.

The processor 910 is a device that executes a program execution support program. The program execution support program is a program that implements the functions of the profile reading unit 110, setting presentation unit 120, setting unit 130, connection unit 140, control unit 150, and communication management unit 160.

The processor 910 is an Integrated Circuit (IC) which performs computation processing. Specific examples of the processor 910 are a Central Processing Unit (CPU), a Digital Signal Processor (DSP), and a Graphics Processing Unit (GPU).

The memory 921 is a storage device that stores data temporarily. A specific example of the memory 921 is a Static Random-Access Memory (SRAM) or a Dynamic Random-Access Memory (DRAM).

The auxiliary storage device 922 is a storage device that stores data. A specific example of the auxiliary storage device 922 is an HDD. The auxiliary storage device 922 may be a portable storage medium such as an SD (registered trademark) memory card, a CF, an NAND flash, a flexible disk, an optical disk, a compact disk, a blu-ray (registered trademark) disk, and a DVD. Note that HDD stands for Hard Disk Drive, SD (registered trademark) for Secure Digital, CF for CompactFlash (registered trademark), and DVD for Digital Versatile Disk.

The input interface 930 is a port to be connected to an input device such as a mouse, a keyboard, and a touch panel. The input interface 930 is specifically a Universal Serial Bus (USB) terminal. The input interface 930 may also be a port to be connected to a Local Area Network (LAN).

The output interface 940 is a port to which a cable of an output apparatus such as a display is to be connected. The output interface 940 is specifically a USB terminal or a High Definition Multimedia Interface (HDMI; registered trademark) terminal. The display is specifically a Liquid Crystal Display (LCD).

The communication device 950 has a receiver and a transmitter. The communication device 950 may be connected to a communication network such as a LAN, the Internet, and a telephone line. The communication device 950 is specifically a communication chip or a Network Interface Card (NIC). The communication device 950 may be connected to the manufacturing facility 200 by USB connection or via a propriety-specification cable such as a twist pair cable.

The program execution support program is read by the processor 910 and executed by the processor 910. Not only the program execution support program but also an Operating System (OS) is stored in the memory 921. The processor 910 executes the program execution support program while executing the OS. The program execution support program and the OS may be stored in the auxiliary storage device. The program execution support program and the OS which are stored in the auxiliary storage device are loaded in the memory 921 and executed by the processor 910. The program execution support program may be incorporated in the OS partly or entirely.

The program execution support device 100 may be provided with a plurality of processors that substitute for the processor 910. The plurality of processors share execution of the program execution support program. Each processor is a device that executes the program execution support program, as the processor 910 does.

Data, information, signal values, and variable values to be utilized, processed, or outputted by the program execution support program are stored in the memory 921, the auxiliary storage device 922, or a register or cache memory in the processor 910.

In each of the profile reading unit 110, the setting presentation unit 120, the setting unit 130, the connection unit 140, the control unit 150, and the communication management unit 160, "unit" may be replaced by "process", "procedure", or "stage". Also, in each of profile reading process, setting presentation process, setting process, connection process, control process, and communication management process, "process" may be replaced by "program", "program product", or "computer readable storage medium recorded with a program".

The program execution support program causes the computer to execute processes, procedures, or stages that correspond to the individual "units" which are the profile reading unit 110, setting presentation unit 120, setting unit 130, connection unit 140, control unit 150, and communication management unit 160 mentioned above with their "units" being replaced by "processes", "procedures", or "stages". Also, the program execution support method is a method carried out as the program execution support device 100 executes the program execution support program.

The program execution support program may be stored in a computer readable recording medium and provided in the form of the recording medium. The program execution support program may also be provided as a program product.

The application device 300 is also a computer that executes the application program 301. As the program execution support device 100 is, the application device 300 is provided with hardware devices such as a processor, a memory, an auxiliary storage device, an input interface, an output interface, and a communication device. Functions of the hardware devices are the same as those of the program execution support device 100.

*Brief Description of Functions*

The profile reading unit 110 reads a profile including input/output information 32 of the application program 301, as an application profile. The application profile is transferred from the application program 301 to the profile reading unit 110.

The storage unit 170 stores, in the storage unit 170, a list of device data representing data to be read and written in the manufacturing facility 200 by the application program 301, as a data list 161. The data list 161 has a lineup of data held by the manufacturing facility 200, including data which the application program does not read. In other words, the data list 161 is a list of device data which are held by the manufacturing facility 200 and which can be read and written by the application program 301.

The setting presentation unit 120 presents a setting means for allocating the device data to the input/output information 32. The setting presentation unit 120 presents a setting means for allocating to the input/output information 32 appropriate device data out of the data list 161. The setting presentation unit 120 also acquires setting information in which the device data is allocated to the input/output information 32.

The setting unit 130 sets connection with the application program 301 based on the application profile and the setting information.

The connection unit 140 supports execution of the application program 301 using the facility data 22 communicated between the program execution support device 100 and the manufacturing facility 200 according to the connection setting by the setting unit 130.

The communication management unit 160 reads and writes facility data from and to the manufacturing facility 200 by communicating with the manufacturing facility 200. The communication management unit 160 is provided with a communication mode to communicate with the manufacturing facility 200, and performs necessary communication management.

The communication management unit 160 may also manage items of facility data that can be read from and written in the manufacturing facility 200. The communication management unit 160 may accumulate the facility data 22 communicated with the manufacturing facility 200, as a database 171. Namely, the communication management unit 160 may not only transfer the read/written facility data 22 to the control unit 150 directly, but may also store the read/ written facility data 22 as necessary in the storage unit 170, as the database 171. The communication mode between the communication management unit 160 and the manufacturing facility 200 may also be a mode according to which the manufacturing facility 200 updates and refers to the database 171 of the communication management unit 160.

Specifically, the communication management unit 160 may read and write facility data of the manufacturing facility 200 using a protocol such as Seamless Message Protocol (SLMP) of CC-Link IE. Alternatively, the communication management unit 160 may read and write a value that is periodically updated between the manufacturing facility 200 and the communication management unit 160, as in FL-net cyclic transmission.

The communication mode is not limited to one type. The communication management unit 160 may use a plurality of types of communication modes as necessary.

FIG. 2 illustrates an example of the data list 161 according to the present embodiment.

In the data list 161, a list of device data 61, representing data to be read from and written in the manufacturing facility 200 by the application program 301, is set. Data name, communication mode, and data designation information are set in the device data 61.

The facility data is data communicated between the manufacturing facility 200 and the program execution support device 100 during the operation. That is, the facility data consists of present values of the individual pieces of device data 61 included in the data list 161, or values to be written in the manufacturing facility 200 from the program execution support device 100.

The device data 61 of the data list 161 is data indicating what the facility data communicated between the program execution support device 100 and the manufacturing facility 200 should designate and in what mode, to enable read/write of the facility data. In a specific example, FIG. 2 indicates that, on the second line of the data list 161, concerning the servo motor α rotation angle, a communication partner X and a memory address Y are designated in accordance with SLMP, to enable read and write of the facility data.

The data list 161 is stored in the storage unit 170 in advance. The data list 161 is specifically an external file described in a standard format. For example, the data list 161 may be generated based on a manual of the manufacturing facility 200. Alternatively, the data list 161 may be generated based on data stored in a Compact Disc (CD) attached with a manual, for example, based on a device Cryptographic Service Provider (CSP)+. The device CSP+ is expressed by an XML-format file. The device CSP+ holds information concerning a spec of the device, information of a device to be open public for application software, data to be acquired from the device and information concerning how to acquire the data, and information that associates these pieces of information with each other.

*Description of Operations*

Figure 3:
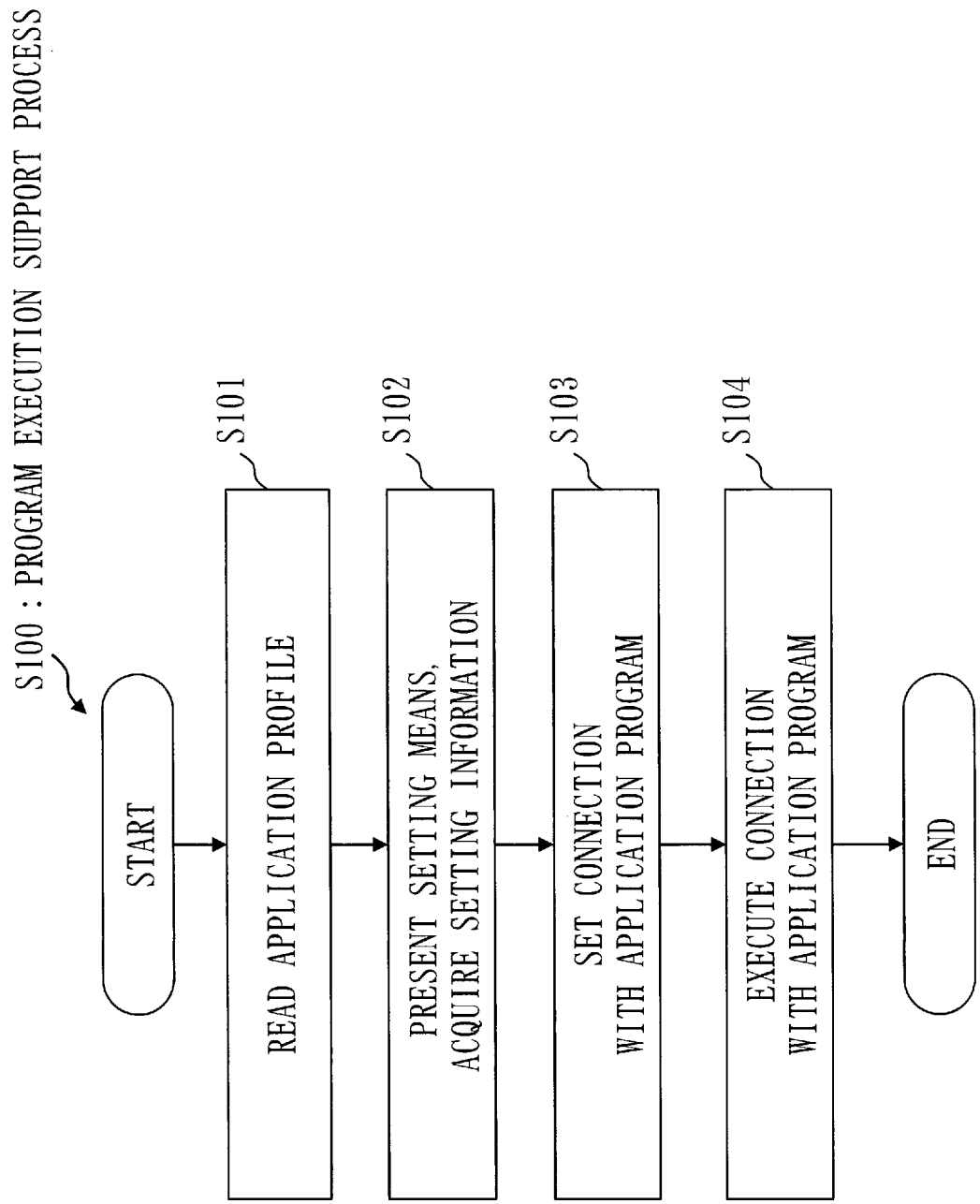
FIG. 3 is a flowchart of a program execution support process according to Embodiment 1.

Program execution support process S100 according to the present embodiment will be described with referring to FIG. 3.

In step S101, the profile reading unit 110 reads an application profile 21 representing a profile of the application program 301. The application profile 21 is generated depending on a property and setting of the application program 301.

Figure 4:
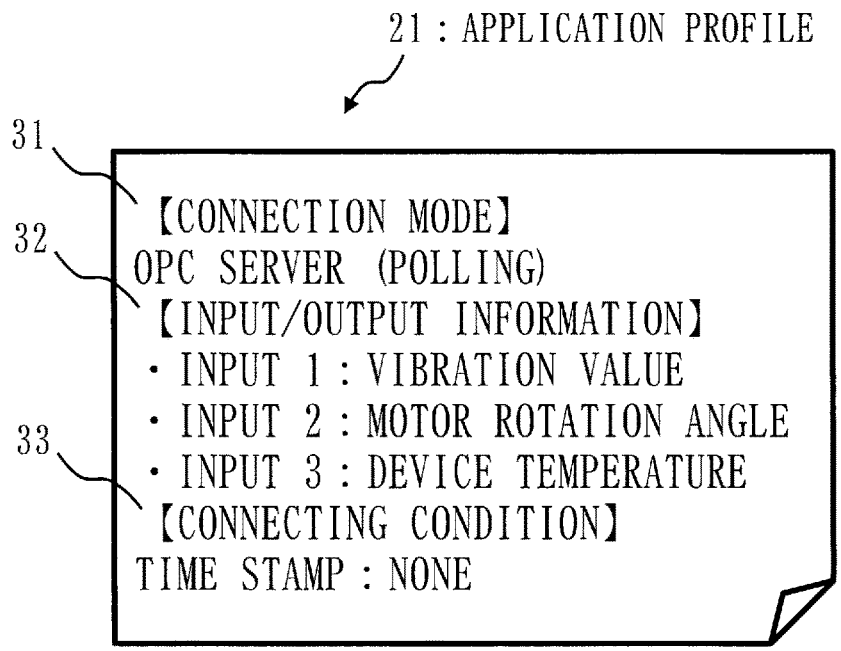
FIG. 4 is a diagram illustrating an example of an application profile according to Embodiment 1.

FIG. 4 is a diagram illustrating a configuration example of the application profile 21 according to the present embodiment.

Specifically, the program execution support device 100 supports execution of a plurality of application programs. The application profile 21 is described in a common format including a connection mode 31, the input/output information 32, and a connecting condition 33. Connection modes employed by the plurality of application programs individually are set in the connection mode 31. Pieces of input/output information of the plurality of application programs are individually set in the input/output information 32. Connecting conditions employed for connection with the plurality of application programs individually are set in the connecting condition 33. The application profile 21 has a common format, but its content varies from one application program to another among the plurality of application programs.

In the application profile 21 of FIG. 4, it is illustrated that the connection mode 31 is polling using an Object Linking and Embedding (OLE) for Process Control (OPC) server. It is illustrated that three types of input information, namely a vibration value, a motor rotation angle, and a device temperature are inputted as the input/output information 32. It is also illustrated that addition of time stamp is unnecessary as the connecting condition 33. If the input/output specification of the application program is fixed, the application profile 21 may be fixed with the application program. Alternatively, the application program may generate the application profile 21 according to the setting of the application program. As a condition under which data is transferred from the program execution support device 100 to the application program, a connecting condition such as a communication period may be set.

In step S102, the setting presentation unit 120 presents a setting means 12 which allocates the device data to the input/output information designated in the application profile 21. Specifically, the setting presentation unit 120 presents, as the setting means 12, a setting window 121 on which the device data is allocated from the data list 161 to the input/output information. The setting presentation unit 120 also presents, as the setting means 12, a setting selection window 122 on which device data to be allocated to the input/out information is selected from the data list 161. Namely, the setting presentation unit 120 displays the setting window 121 or the setting selection window 122, so as to support setting of the device data to the input/output information by a setting person.

Then, the setting presentation unit 120 acquires setting information 13 in which the device data is allocated to the input/output information.

Figure 5:
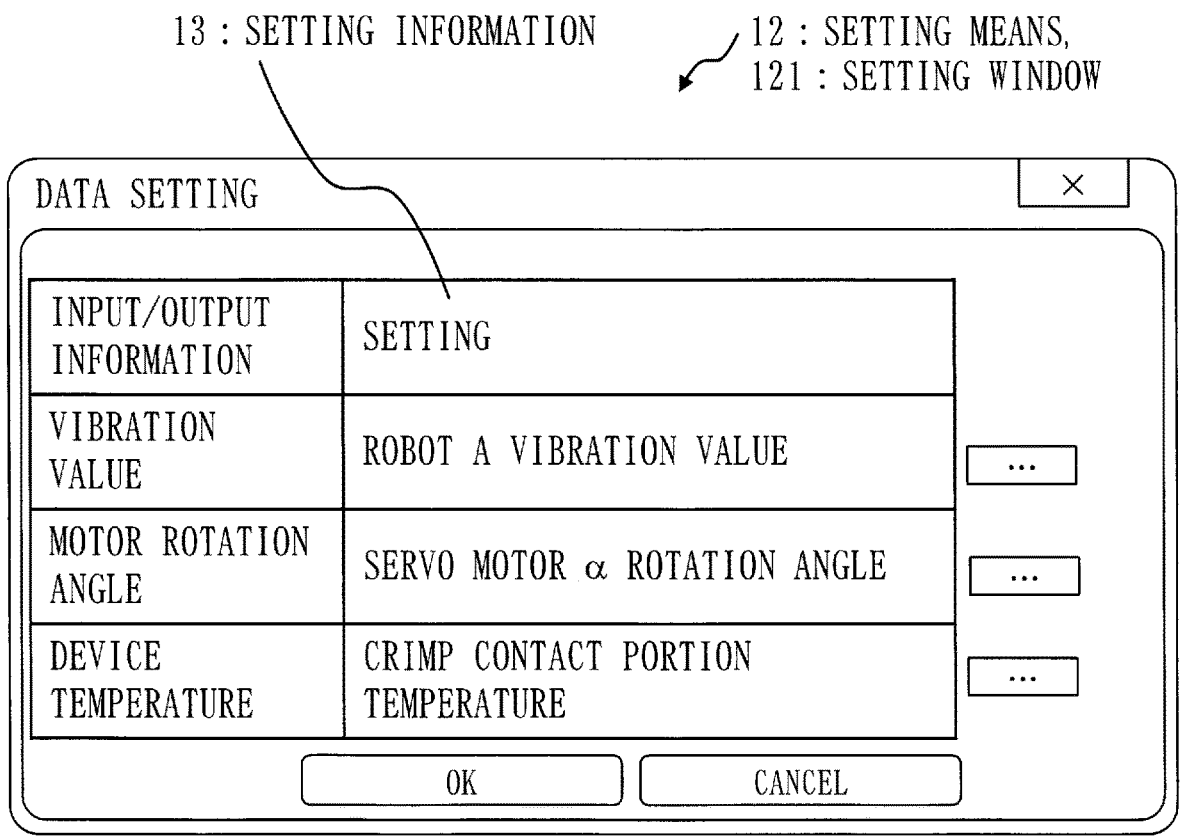
FIG. 5 is a diagram illustrating an example of a setting window according to Embodiment 1.

FIG. 5 is a diagram illustrating a configuration of the setting window 121 according to the present embodiment.

Figure 6:
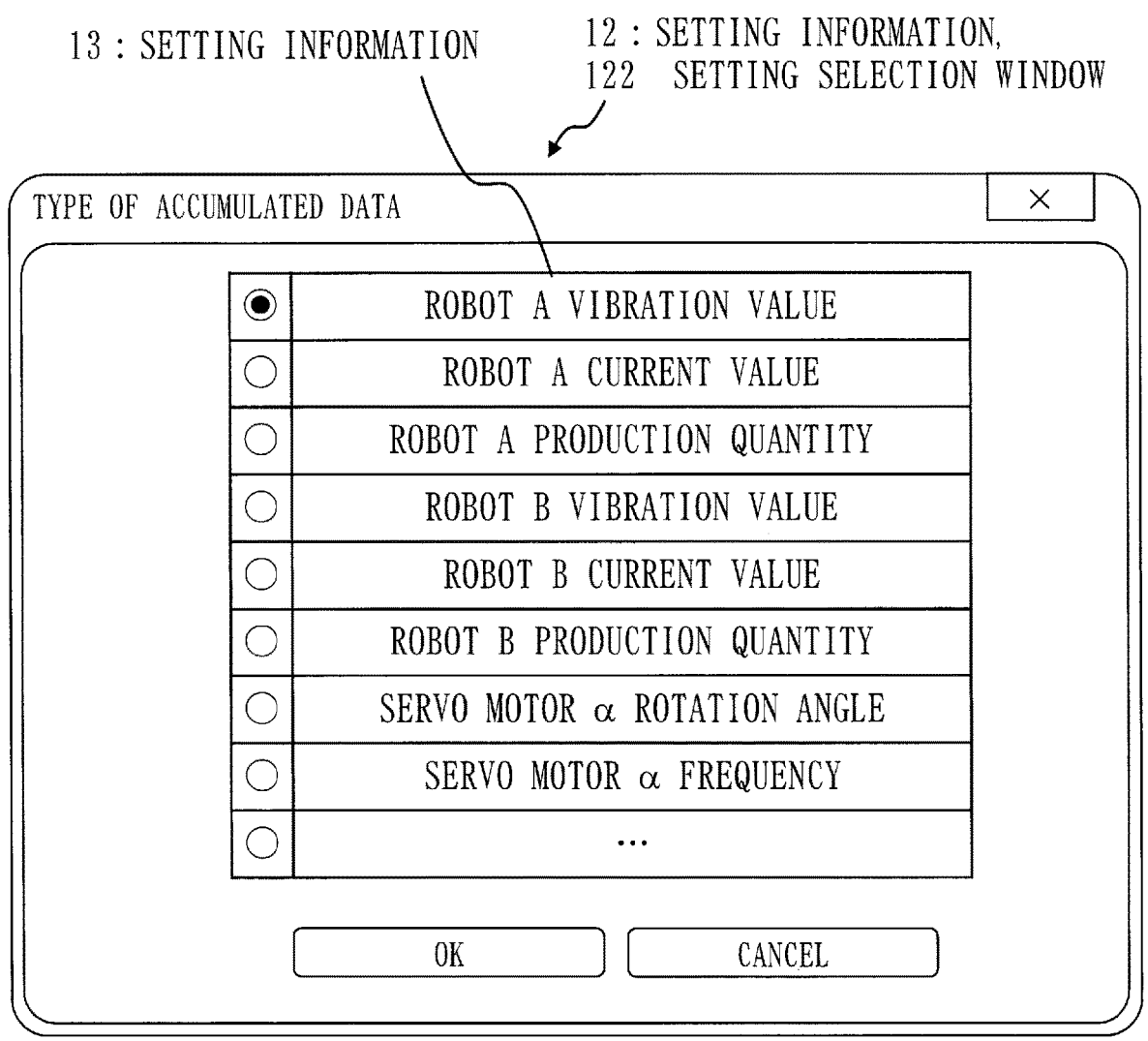
FIG. 6 is a diagram illustrating an example of a setting selection window according to Embodiment 1.

FIG. 6 is a diagram illustrating a configuration of the setting selection window 122 according to the present embodiment.

Specifically, the setting presentation unit 120 displays the setting window 121 as illustrated in FIG. 5 to a display.

Alternatively, the setting presentation unit 120 may read a file in which the setting information 13 is written.

The setting presentation unit 120 may display the setting window 121 to the display and prompt the setting person to input device data that matches with the input/output information, directly in the form of character strings. For example, the setting presentation unit 120 displays the data list 161 together with the setting window 121 to the display. Then, the setting person inputs the device data that matches with the input/output information while referring to the data list 161. Alternatively, as illustrated in FIG. 6, the setting presentation unit 120 may display the setting selection window 122 to the display and prompt the setting person to select device data that matches with the input/output information from the data list 161. There is a case where the application profile 21 describes sending of data covering a predetermined period of time to the application program collectively. When it is necessary to send data in this manner according to the condition of the manufacturing facility 200, the setting presentation unit 120 displays a window on which condition setting is to be performed such as, of the manufacturing facility 200, what data value that has reached what condition is to be sent.

In step S103, the setting unit 130 sets an interface necessary for connection with the application program 301, based on the setting information 13 acquired by the setting presentation unit 120, and based on the application profile 21. The setting unit 130 is also called interface setting unit.

Specific description will be made with referring to an example of FIG. 5.

In the example of FIG. 5, as the facility data, "robot A vibration value", "servo motor α rotation angle", and "crimp contact portion temperature" are communicated by the communication mode of the communication management unit 160. Then, the setting unit 130 performs a setting of inputting the facility data to the OPC server of the connection unit 140, and a setting of inputting values of the OPC server to the application program 301 as the vibration value, the motor rotation angle, and the device temperature.

In step S104, the connection unit 140 supports execution of the application program 301 using the facility data 22, according to the connection setting of the setting unit 130. Specifically, the connection unit 140 receives/outputs data from/to the application program 301 based on the setting mode of the interface being set by the setting unit 130. Thus, in operation after the connection setting, the application program 301 is executed while the application program 301 and the manufacturing facility 200 communicate with each other via the program execution support device 100. The connection unit 140 is also called application interface unit which executes an interface with the application program 301.

For example, the communication management unit 160 may accumulate the facility data 22 communicated with the manufacturing facility 200, as the database 171. In this case, the connection unit 140 may receive/output data from/to the application program 301 using the facility data included in the database 171.

The communication management unit 160 communicates with the manufacturing facility 200 in accordance with the connection setting of the setting unit 130. In the example of FIG. 2, the communication management unit 160 repeats a process of reading the servo motor α rotation angle and the crimp contact portion temperature from memory addresses Y and Z of a communication partner X by SLMP and writing data to the OPC server of the connection unit 140. Concerning the robot A vibration value, update of the value of the database 1 by the manufacturing facility 200 has been set, so there is no need to add a new communication process. The data communicated by the communication management unit 160 is read/written by the application program 301 via the connection unit 140, so that processes such as monitoring, control, and management of the manufacturing facility 200 by the application program 301 are performed.

\*\*\*Other Configurations\*\*\*

In the present embodiment, the device that executes the application program is explained as a device that is different from the program execution support device 100. However, a configuration may be possible in which the application program is executed by the program execution support device 100. The program execution support device 100 may be provided with a constituent element that executes the application program, and the application program may be executed by the connection unit.

That is, the connection unit and the application program may be modules that operate in the same hardware device, or may be modules that operate in different hardware devices connected via a LAN cable or the like, and operate by communicating data with each other by TCP/IP communication or the like. The application as the object may be limited to one application. The application as the object may be enabled to be connected to a plurality of applications simultaneously.

In the present embodiment, the connection setting by the setting unit 130 assumes a setting in the program execution support device 100, such as setting of the connection unit 140 and the communication management unit 160. However, the connection setting by the setting unit 130 is not limited to the connection setting in the program execution support device 100. As necessary, a connection setting that can be read by the application device 300 may be generated, and the application device 300 may read the connection setting.

The present embodiment illustrates an example in which a setting of inputting the facility data to the OPC server of the connection unit is generated. There is, however, a case where data stored in the communication management unit can be used directly, as in a case where the communication management unit has an OPC server, or in a case where the application program requests a value of the database, the value being already managed by the database which is managed by the communication management unit. In that case, a setting of transferring the facility data to the application program by bypassing the connection unit may be generated.

The setting to be generated by the setting unit need not be a mere setting, but may be a program to be generated by a program generation rule which is predetermined in advance in accordance with setting information obtained by the setting means.

In the present embodiment, the functions of the profile reading unit 110, setting presentation unit 120, setting unit 130, connection unit 140, control unit 150, and communication management unit 160 are implemented by software. In a modification, the functions of the profile reading unit 110, setting presentation unit 120, setting unit 130, connection unit 140, control unit 150, and communication management unit 160 are implemented by hardware.

A configuration may be possible in which the program execution support device 100 is provided with an electronic circuit, the memory 921, the auxiliary storage device 922, the input interface 930, and the output interface 940. Namely, the program execution support device 100 may be provided with an electronic circuit in place of the processor 910.

The electronic circuit is a dedicated electronic circuit that implements the functions of the profile reading unit 110, setting presentation unit 120, setting unit 130, connection unit 140, control unit 150, and communication management unit 160.

The electronic circuit is specifically a single circuit, a composite circuit, a programmed processor, a parallel-programmed processor, a logic IC, a GA, an ASIC, or an FPGA. Note that GA stands for Gate Array, ASIC for Application Specific Integrated Circuit, and FPGA for Field-Programmable Gate Array.

The functions of the profile reading unit 110, setting presentation unit 120, setting unit 130, connection unit 140, control unit 150, and communication management unit 160 may be implemented by one electronic circuit, or by a plurality of electronic circuits through distribution.

According to another modification, some of the functions of the profile reading unit 110, setting presentation unit 120, setting unit 130, connection unit 140, control unit 150, and communication management unit 160 may be implemented by an electronic circuit, and the remaining functions may be implemented by software.

The processor and the electronic circuit are referred to as processing circuitry as well. That is, in the program execution support device 100, the functions of the profile reading unit 110, setting presentation unit 120, setting unit 130, connection unit 140, control unit 150, and communication management unit 160 are implemented by processing circuitry.

Description of Effect of Present Embodiment

With the program execution support device 100 according to the present embodiment, even if a different application program is to be used, the user can perform an input/output setting of data required by the application program and can operate the application program only by setting facility data to input/output information with a versatile common setting means presented by the setting presenting unit. Usually, when using a new application program, a framework must be constructed that learns an input/output rule of the application and generates input/output data suitable to the input/output rule. However, with the program execution support device 100 according to the present embodiment, even when a new application program is to be used, time and effort necessary for constructing the framework that generates the input/output data suitable to the input/output rule can be reduced. Therefore, with the program execution support device 100 according to the present embodiment, the burden of allocating the input/output information at the time of executing the application program can be reduced, and the burden of executing the application program can also be reduced.

Embodiment 2

In the present embodiment, a difference from Embodiment 1 will mainly be described. The same configuration as in Embodiment 1 will be denoted by the same reference sign, and its description will sometimes be omitted.

\*\*\*Description of Configuration\*\*\*

In the present embodiment, a storage unit 170 stores attribute information of device data included in a data list 161, as data attribute information 162. In the present embodiment, a program execution support device 100a will be described which, using the data attribute information 162, can automatically limit and automatically select an option in setting device data in a setting presentation unit 120a.

Figure 7:
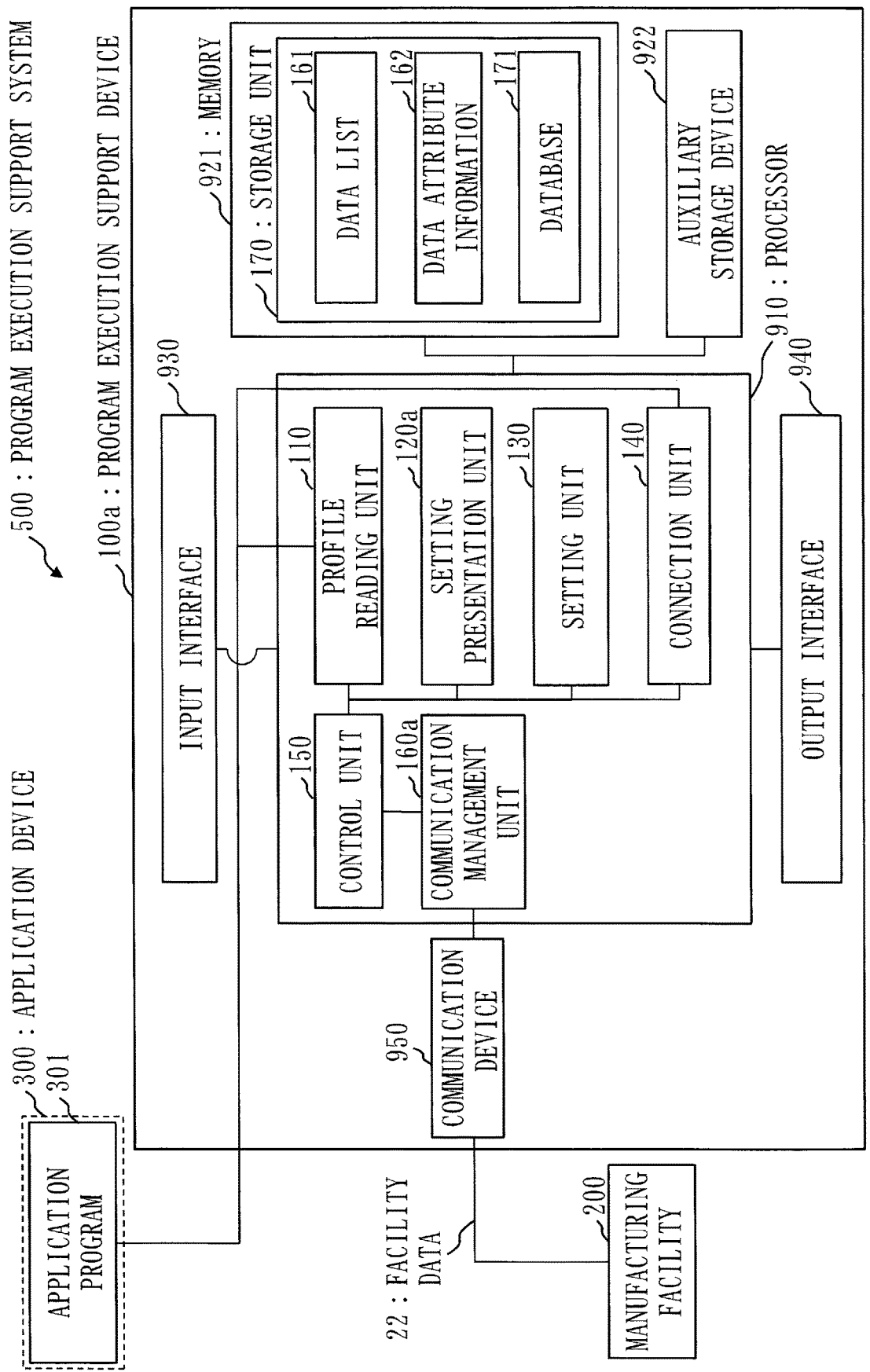
FIG. 7 is a configuration diagram of a program execution support system according to Embodiment 2.

FIG. 7 is a diagram illustrating a configuration of the program execution support device 100a according to the present embodiment.

The data attribute information 162 includes attribute information of device data included in the data list 161. The data attribute information 162 may be acquired from an external file described in the standard format.

The setting presentation unit 120a presents a setting means with which device data to be allocated to the input/output information is selected from the data list 161 based on the data attribute information 162. The setting presentation unit 120a may present, as the setting means, a setting selection window for narrowing down the device data to be allocated to the input/output information, from the data list 161 based on the attribute information included in the data attribute information 162. Alternatively, the setting presentation unit 120a may narrow down the device data to be allocated to the input/output information, from the data list 161 automatically based on the attribute information included in the data attribute information 162.

Figure 8:
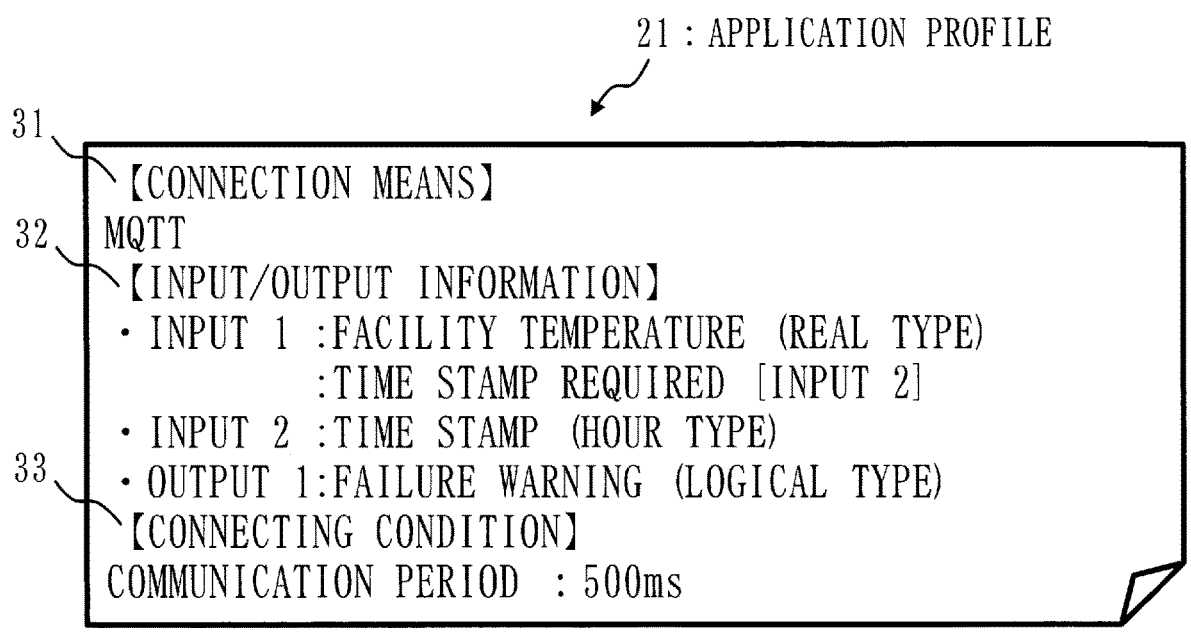
FIG. 8 is a diagram illustrating an example of an application profile according to Embodiment 2.

FIG. 8 is a diagram illustrating a configuration of an application profile 21a according to the present embodiment. FIG. 9 is a diagram illustrating an example of the data attribute information 162 according to the present embodiment.

The setting presentation unit 120a displays a setting window for allocating the device data to the input/output information, based on the application profile 21a and the data attribute information 162. A mode of setting the device data to the input/output information automatically or semi-automatically will be described with referring to FIGS. 8 and 9.

Items that can be set in input 1 are narrowed down to Nos. 1 to 5 in view of the communication type, Nos. 1, 3, and 4 in view of the data type, and Nos. 1 and 4 in view of whether or not a time stamp is attached. Furthermore, the items may be narrowed down to No. 1 automatically because a collection period should be shorter than a period required by the application program. Alternatively, the items may be selectable between No. 1 and No. 4 by the user, provided that a warning is displayed that a period of No. 4 is longer than the period required by the application.

An item that can be set in input 2 is automatically decided on No. 2 if input 1 is No. 1, and on No. 5 if input 1 is No. 4.

Items that can be set in output 1 are narrowed down to Nos. 6 and 8 in view of the communication type and the data type. As items to be set in output 1, the setting presentation unit 120a displays "failure warning display 1" and "quality warning display 1" as options. From these names, the user can judge that "failure warning display 1" is appropriate, and can set the same.

The data attribute information 162 may be inputted manually by the user via an input interface 930. Alternatively, data in which input/output information of a manufacturing system or a manufacturing device is described in a standard format may be read as an external file, and may be set as the data attribute information 162. Together with the data attribute information 162, a data list 161 may be acquired as the above-mentioned external file. A practical example of the standard format is device CSP+. Device CSP+ is expressed by an XML-format file. In device CSP+, information concerning specification of the device, device information to be open to the public for application software, data to be acquired from the device and information concerning how to acquire the data, and information that associates these pieces of information are held.

In above-mentioned Embodiments 1 to 2, individual units of the program execution support device are described as independent function bocks. However, the configuration of the program execution support device is not necessarily a configuration as in the above-described embodiments. The function block of the program execution support device may have any configuration as far as it can implement the functions described in the above embodiments. The program execution support device does not necessarily consist of a single device but may be a system consisting of a plurality of devices.

Of Embodiments 1 to 2, a plurality of portions may be combined and practiced. Alternatively, of these embodiments, one portion may be practiced. Furthermore, these embodiments may be combined as a whole or partly, and practiced.

That is, in Embodiments 1 to 2, the embodiments may be combined arbitrarily, any constituent element of each embodiment may be modified, or any constituent element of each embodiment may be omitted.

The embodiments described above are essentially preferable exemplifications and are not intended to limit the scope of the present invention, the scope of the applied product of the present invention, and the scope of usage of the present invention. Various changes may be made as necessary in the above-mentioned embodiments.

REFERENCE SIGNS LIST

12: setting means; 13: setting information; 21, 21a: application profile; 22: facility data; 31: connection mode; 32: input/output information; 33: connecting condition; 61: device data; 100, 100a: program execution support device; 110: profile reading unit; 120, 120a: setting presentation unit; 121: setting window; 122: setting selection window; 130: setting unit; 140: connection unit; 150: control unit; 160, 160a: communication management unit; 161: data list; 162: data attribute information; 170: storage unit; 171: database; 200: manufacturing facility; 300: application device; 301: application program; 500: program execution support system; 910: processor; 921: memory; 922: auxiliary storage device; 930: input interface; 940: output interface; 950: communication device.

The invention claimed is:

1. A program execution support device which supports execution of an application program using facility data communicated with a manufacturing facility, the program execution support device comprising:

processing circuitry
to read an application profile representing a profile of the application program, the application profile including input/output information of the application program, a data form of the input/output information, and a connecting condition employed by the application program,
to present a setting means for allocating, to the input/output information, device data representing data to be read and written in the manufacturing facility by the application program, and to acquire setting information in which the device data is allocated to the input/output information, to set connection with the application program based on the application profile and the setting information, and to support execution of the application program using the facility data according to connection setting being performed, wherein the program execution support device comprises a memory to store a data list and data attribute information, the data list being a list of the device data, the data attribute information including a data type of the device data included in the data list, and a communication type that prescribes communication of the device data, and wherein the processing circuitry presents the setting means for narrowing down the device data to be allocated to the input/output information from the data list such that the data type of the device data and the communication type satisfy the data form and the connecting condition which are included in the application profile.

2. The program execution support device according to claim 1, wherein the processing circuitry presents, as the setting means, a setting window on which the device data is allocated to the input/output information based on the application profile and the data list.

3. The program execution support device according to claim 1, wherein the processing circuitry presents, as the setting means, a setting selection window on which the device data to be allocated to the input/out information is selected from the data list.

4. The program execution support device according to claim 3, wherein the processing circuitry presents, as the setting means, the setting selection window for narrowing down the device data to be allocated to the input/output information, from the data list.

5. The program execution support device according to claim 3, wherein the processing circuitry presents the setting means for narrowing down the device data to be allocated to the input/output information, from the data list automatically.

6. The program execution support device according to claim 1, wherein the data list is an external file described in a standard format.

7. The program execution support device according to claim 1, wherein the processing circuitry accumulates facility data communicated with the manufacturing facility, as a database, and supports execution of the application program using facility data included in the database.

8. The program execution support device according to claim 1, wherein the program execution support device supports execution of a plurality of application programs, and wherein the processing circuitry reads the application profile described in a common format including a connection mode employed by each of the plurality of application programs, input/output information of each of the plurality of application programs, and a connecting condition for connection with each of the plurality of application programs.

9. A program execution support method for a program execution support device which supports execution of an application program using facility data communicated with a manufacturing facility, the program execution support method comprising:

reading an application profile representing a profile of the application program, the application profile including input/output information of the application program, a data form of the input/output information, and a connecting condition employed by the application program;

storing a data list and data attribute information, the data list being a list of device data representing data to be read and written in the manufacturing facility by the application program, the data attribute information including a data type of the device data included in the data list, and a communication type that prescribes communication of the device data, presenting a setting means for allocating the device data to the input/output information, and acquiring setting information in which the device data is allocated to the input/output information, wherein with the setting means, the device data to be allocated to the input/output information is selected from the data list such that the data type of the device data and the communication type satisfy the data form and the connecting condition which are included in the application profile;

setting connection with the application program based on the application profile and the setting information; and supporting execution of the application program using the facility data according to connection setting being performed by the setting unit.

10. A non-transitory computer readable recording medium storing a program execution support program for a program execution support device which supports execution of an application program using facility data communicated with a manufacturing facility, the program execution support program comprising:

a profile reading process of reading an application profile representing a profile of the application program, the application profile including input/output information of the application program, a data form of the input/output information, and a connecting condition employed by the application program;

a process of storing a data list and data attribute information, the data list being a list of device data representing data to be read and written in the manufacturing facility by the application program, the data attribute information including a data type of the device data included in the data list, and a communication type that prescribes communication of the device data;

a setting presenting process of presenting a setting means for allocating device data to the input/output information, and acquiring setting information in which the device data is allocated to the input/output information, wherein with the setting means, the device data to be allocated to the input/output information is selected from the data list such that the data type of the device data and the communication type satisfy the data form and the connecting condition which are included in the application profile;

a setting process of setting connection with the application program based on the application profile and the setting information; and a connection process of supporting execution of the application program using the facility data according to connection setting being performed by the setting unit.

* * * * *